United States Patent
Desrues

(10) Patent No.: US 9,835,745 B2
(45) Date of Patent: Dec. 5, 2017

(54) LOW FREQUENCY EMISSION AND RECORDING FOR SEISMIC DATA ACQUISITION

(71) Applicant: CGG SERVICES SA, Massy (FR)

(72) Inventor: Karine Desrues, Massy (FR)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 14/762,210

(22) PCT Filed: Jan. 22, 2014

(86) PCT No.: PCT/EP2014/051265
§ 371 (c)(1),
(2) Date: Jul. 21, 2015

(87) PCT Pub. No.: WO2014/114681
PCT Pub. Date: Jul. 31, 2014

(65) Prior Publication Data
US 2015/0346365 A1    Dec. 3, 2015

Related U.S. Application Data

(60) Provisional application No. 61/755,696, filed on Jan. 23, 2013.

(51) Int. Cl.
*G01V 1/38* (2006.01)
*G01V 1/20* (2006.01)
(Continued)

(52) U.S. Cl.
CPC .............. *G01V 1/201* (2013.01); *G01V 1/137* (2013.01); *G01V 1/186* (2013.01); *G01V 1/3808* (2013.01);
(Continued)

(58) Field of Classification Search
CPC .... G01V 1/3808; G01V 1/3861; G01V 1/201; G01V 1/186; G01V 1/137; G01V 1/3817;
(Continued)

(56) References Cited

U.S. PATENT DOCUMENTS 5,894,450 A * 4/1999 Schmidt ................ H04B 13/02
367/131
6,961,284 B2   11/2005 Moldoveanu
(Continued)

FOREIGN PATENT DOCUMENTS

EP      1403662 A1    3/2004
WO   2012041844 A1    4/2012

OTHER PUBLICATIONS

Hegna et al., "The low frequency output of marine air-gun arrays," SEG Technical Program Expanded Abstracts, 2011 SEG Annual Meeting, Sep. 18-23, 2011, pp. 77-81, San Antonio, TX, USA.
(Continued)

*Primary Examiner* — Daniel L Murphy
(74) *Attorney, Agent, or Firm* — Patent Portfolio Builders PLLC

(57) ABSTRACT

Presented are methods and systems for collecting marine seismic data. The collected seismic data can be low frequency (e.g., less than 10 Hz) or it can be a full seismic bandwidth (1-200 Hz) depending on if the low frequency tuned sources and tuned receivers are combined with conventional sources and receivers. The low frequency sources can be towed or they can be autonomous and positioned in the survey area by tether, drifting or self-propelled. The tuned low frequency receivers are towed at a depth greater than conventional receivers and the sources can be fired independently or simultaneously.

20 Claims, 15 Drawing Sheets

(51) Int. Cl.
*G01V 1/18* (2006.01)
*G01V 1/137* (2006.01)

(52) U.S. Cl.
CPC .......... *G01V 1/3861* (2013.01); *G01V 1/3817* (2013.01); *G01V 1/3843* (2013.01); *G01V 2210/127* (2013.01); *G01V 2210/1212* (2013.01); *G01V 2210/1293* (2013.01); *G01V 2210/1423* (2013.01)

(58) Field of Classification Search
CPC ..... G01V 2210/127; G01V 2210/1293; G01V 2210/1212; G01V 1/3843; G01V 2210/1423
USPC ...................................................... 367/15, 20
See application file for complete search history.

(56) References Cited

U.S. PATENT DOCUMENTS

| | | | |
|---|---|---|---|
| 7,372,769 B2 | 5/2008 | Grion | |
| 7,379,385 B2 | 5/2008 | Ferber | |
| 7,679,991 B2 | 3/2010 | Ferber | |
| 7,800,977 B2 | 9/2010 | Grion | |
| 8,116,166 B2 | 2/2012 | Robertsson et al. | |
| 8,437,998 B2 * | 5/2013 | Routh | G01V 1/28 703/10 |
| 2009/0016158 A1 | 1/2009 | Gratacos | |
| 2009/0245021 A1 | 10/2009 | Robertsson et al. | |
| 2011/0176384 A1 | 7/2011 | Soubaras | |
| 2011/0299360 A1 | 12/2011 | Lansley et al. | |
| 2011/0305109 A1 | 12/2011 | Soubaras | |
| 2012/0048642 A1 | 3/2012 | Hopperstad et al. | |
| 2012/0075950 A1 | 3/2012 | Kragh et al. | |
| 2012/0092956 A1 | 4/2012 | Soubaras | |
| 2012/0155217 A1 | 6/2012 | Dellinger et al. | |
| 2012/0224454 A1 | 9/2012 | Soubaras | |

OTHER PUBLICATIONS

Soubaras et al., "Variable-depth streamer—a broadband marine solution," First Break, Dec. 2010, vol. 28, No. 12.
International Search Report and Written Opinion dated Apr. 25, 2014 in related International Application No. PCT/EP2014/051265.
Examination Report in corresponding Australian Application No. 2014209936 dated Mar. 20, 2017. (Reference D1 was previously made of record in an Information Disclosure Statement submitted on Jul. 21, 2015.).
Office Action in corresponding Mexican Application No. MX/a/2015/009551 dated Jan. 17, 2017. All references cited were previously made of record in an Information Disclosure Statement dated Jul. 21, 2015.).

* cited by examiner

LOW FREQUENCY EMISSION AND RECORDING FOR SEISMIC DATA ACQUISITION

RELATED APPLICATION

The present application is the National Stage of the International Application No. PCT/EP2014/051265, filed Jan. 22, 2014, which claims priority and benefit from U.S. Provisional Patent Application No. 61/755,696, filed Jan. 23, 2013, entitled "METHOD FOR LOW FREQUENCY EMISSION AND RECORDING, MIXED OR NOT WITH COMMON SEISMIC ACQUISITION AND RECORDING APPARATUS," to Karine DESRUES, the disclosure of which is incorporated herein by reference.

TECHNICAL FIELD

Embodiments of the subject matter disclosed herein generally relate to methods and systems for seismic data acquisition and, more particularly, to mechanisms and techniques for generating and collecting low frequency seismic data.

BACKGROUND

Seismic data acquisition and processing techniques are used to generate a profile (image) of a geophysical structure (subsurface) of the strata underlying the seafloor. Among other things, seismic data acquisition involves the generation of acoustic waves and the collection of reflected/refracted versions of those acoustic waves to generate the image. This image does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process in the field of seismic surveying.

Mapping subsurface geology during exploration for oil, gas, and other minerals and fluids uses a form of remote sensing to construct two-dimensional, three-dimensional or four-dimensional, i.e., time as the fourth dimension, images of the subsurface. The process is known as seismic surveying, wherein an energy source transmits pressure pulses into the earth. These pressure pulses can be reflected by geological interfaces associated with the earth and subsequently recorded at the surface by arrays of detectors. The arrays of detectors are configured as a receiver spread of a plurality of streamers towed in parallel and separated by tens to hundreds of meters with each streamer containing a plurality of receivers. The streamers can be configured to be towed in a flat, slanted or variable depth arrangement to optimize each receiver's recording capabilities for the associated bandwidth.

Conventional seismic surveys use one or more sources capable of generating frequencies of approximately 8 Hz to 70 Hz in bandwidth. FIG. 1 depicts a graph of these frequencies sampled in a conventional seismic survey. Although the conventional seismic data can be extrapolated to generate seismic images, producing a higher quality seismic image requires expanding the bandwidth of the seismic sources in both a lower 202 and a higher 204 frequency direction. In recent years advances such as a BroadSeis system by CGG Services SA have provided for a broadened bandwidth in both directions 202, 204 for seismic data collection as illustrated in the graph depicted in FIG. 2. More recent developments such as a BroadSource system by CGG Services SA have provided for extending the available sampling frequency at the high end 302 of the seismic sampling bandwidth as illustrated in the graph depicted in FIG. 3. Advances such as those described herein have increased the available sampling bandwidth to a range of from 6 Hz to 200 Hz.

In the above described seismic data acquisition systems, seismic data associated with the very low seismic bandwidth of 1 Hz to 6 Hz is generated based on extrapolation of the seismic data collected from the higher bandwidth. The calculated seismic data provides the theoretical data necessary to generate the seismic images but the images are of a lower quality because they are based on the theoretical very low seismic bandwidth data.

A next step in improving the quality of seismic imaging requires seismic sources capable of generating waves in the 1 Hz to 6 Hz bandwidth range, receivers capable of detecting waves in the 1 Hz to 6 Hz bandwidth and seismic survey configurations appropriate to include properly configured 1 Hz to 6 Hz bandwidth sources and receivers at locations appropriate for recording the 1 Hz to 6 Hz bandwidth waves.

Accordingly, it would be desirable to provide systems and methods that avoid the afore-described problems and drawbacks associated with seismic data acquisition at frequencies of 1 Hz to 6 Hz based on properly configuring low frequency sources and receivers.

SUMMARY

According to an embodiment, there is a method for acquiring seismic data. The method includes tuning (1302) one or more additional seismic sources to generate low frequency seismic waves wherein said low frequency seismic waves have a frequency less than 10 Hz; tuning (1304) one or more seismic receivers to optimize recording of said low frequency seismic waves; generating (1306) said low frequency seismic waves with said additional one or more seismic sources over a predefined seismic survey area; and recording (1308) said low frequency seismic waves with said one or more seismic receivers, wherein said one or more seismic receivers are positioned at a predetermined depth larger than 30 m.

According to another method, there is a system for collecting seismic data. The system includes a plurality of additional low frequency tuned seismic sources (708) for generating low frequency seismic waves wherein said low frequency seismic waves are waves having a frequency less than 10 Hz; a plurality of low frequency tuned seismic receivers (706), attached to a first plurality of streamers (704), for recording low frequency seismic waves; one or more tow vessels (702) for towing said first plurality of streamers across a predefined seismic acquisition area; and a recording device (710) for archiving recorded seismic data.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of configuring a seismic survey system to emit and record seismic waves in the low frequency range, for example, less than 10 Hz. In one example, the low frequency range is between 1 Hz to 8 Hz. However, the embodiments to be discussed next are not limited to these frequencies or configurations, but may be extended to other arrangements or frequencies as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments herein, methods and systems for configuring a seismic survey system to emit and record seismic waves with frequencies less than 10 Hz, e.g., in a 1 Hz to 6 Hz range are described. The methods and systems include sources configured to emit waves in the 1 Hz to 6 Hz frequency band and receivers configured to record waves in the 1 Hz to 6 Hz frequency band. The sources and receivers are not limited to this frequency band. The sources and receivers are configured at positions and depths suitable for the frequency and can be combined with conventional configurations such that the entire frequency bandwidth of interest can be collected.

Figure 4:
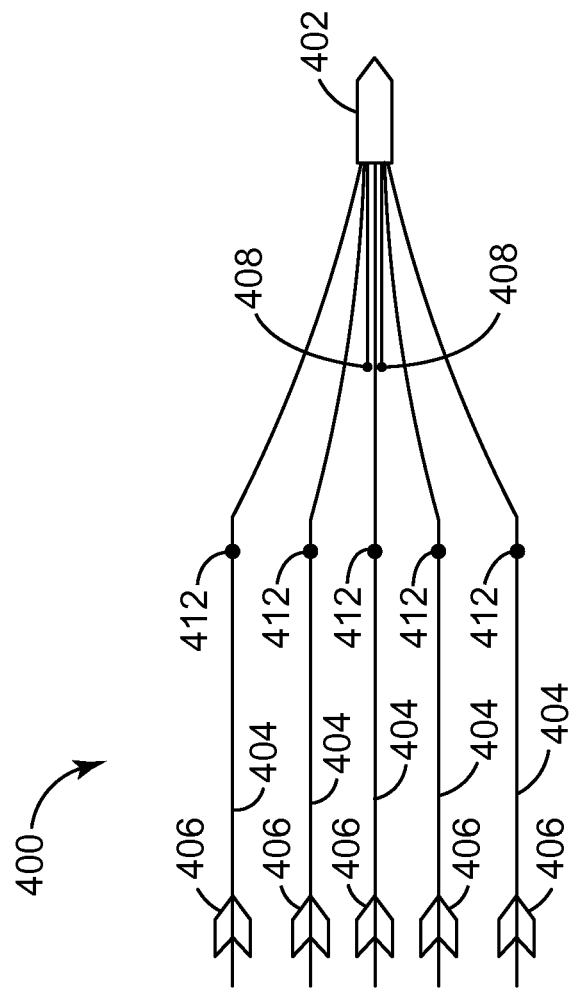
FIG. 4 depicts various aspects of an exemplary marine seismic survey system in which various low frequency emission and recording embodiments can be implemented.

In order to provide some context for the subsequent exemplary embodiments related to configuring a seismic survey system to emit and record seismic waves in a 1 Hz to 6 Hz range, consider first a seismic data acquisition process and system as will now be described with respect to FIGS. 4, 5 and 6. In FIG. 4, a data acquisition system 400 includes a ship 402 towing a plurality of streamers 404 that can extend one or more kilometers behind the ship 402. Each of the streamers 404 can include one or more "birds" 406 that maintain the streamer 404 in a known fixed position relative to other streamers 404. Further, the one or more "birds" 406 are capable of moving the streamers 404 as desired according to communications received by the birds 406 from the ship 402.

One or more source arrays 408, can also be towed by ship 402, or another ship (not shown), for generating seismic waves. Source arrays 408 can be placed either in front of or behind the receivers 412 (one representative receiver per streamer), or both behind and in front of the receivers 412. The seismic waves generated by the source arrays 408 propagate downward and either reflect off the sea floor or penetrate the seafloor. Seismic waves that penetrate the sea floor are eventually reflected by one or more reflecting structures (not shown in FIG. 4) back to the surface of the sea. The reflected seismic waves then propagate upward and are detected by the receivers 412 disposed on the streamers 404. The seismic waves then reflect off of the free surface, i.e., the surface of the sea, traveling downward and are once again detected by the receivers 412 disposed on streamers 404 as receiver ghosts. This process is generally referred to as "shooting" a particular seafloor area, with the seafloor area referred to as a "cell" and the sea surface referred to as a "free surface."

Figure 5:
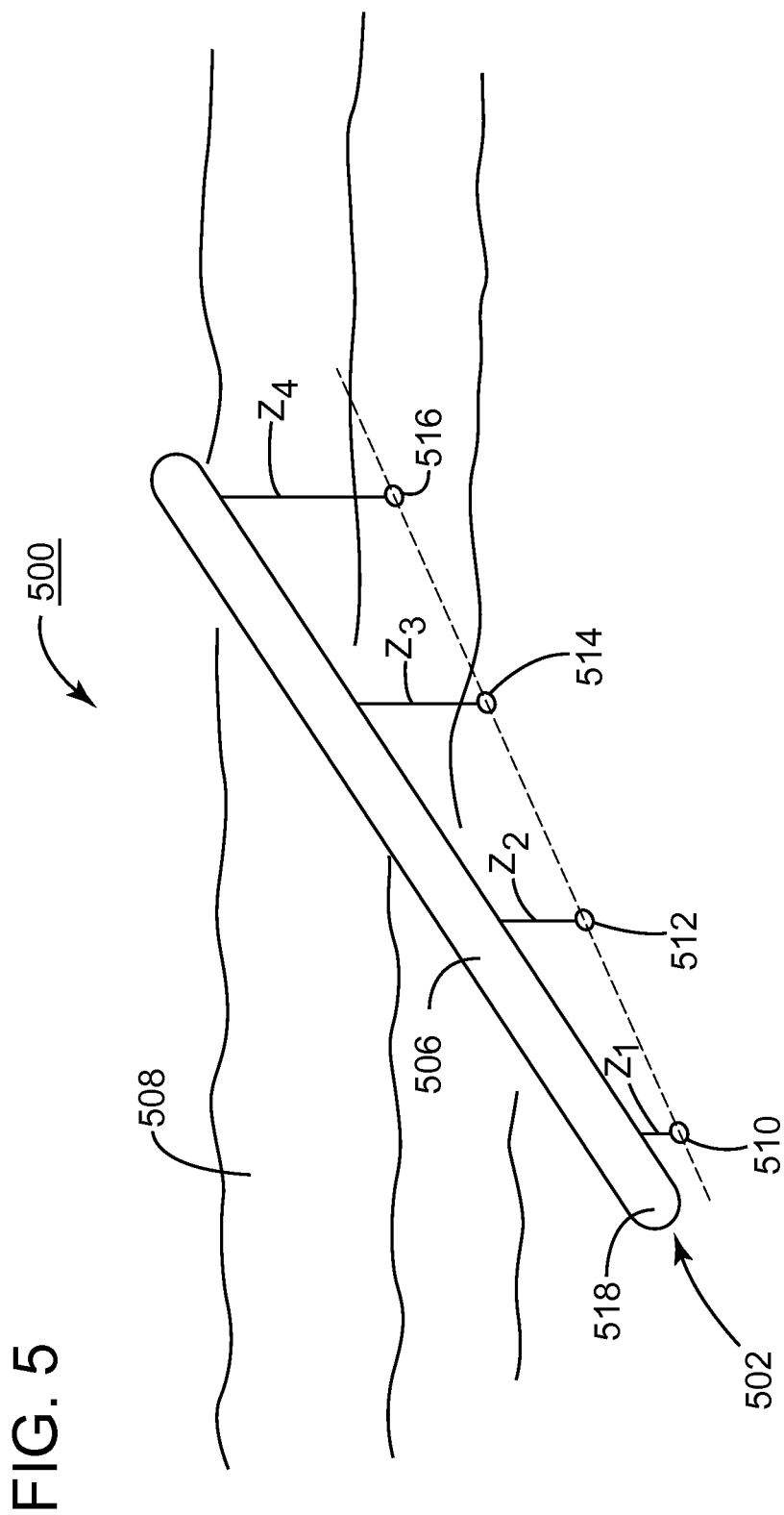
FIG. 5 depicts an exemplary variable-depth marine seismic source.

Looking to FIG. 5, the embodiments can be used with a multi-level source 500. The multi-level source 500 has one or more sub-arrays. The first sub-array 502 has a float 506 that is configured to float at the water surface 508 or underwater at a predetermined depth. Plural source points 510, 512, 514, 516 are suspended from the float 506 in a predetermined pattern. A first source point 510 can be suspended closest to the head 518 of the float 506, at a first depth z1. A second source point 512 can be suspended at a second depth z2, different from z1. A third source point 514 can be suspended at a third depth z3, different from both z1 and z2, and so on. FIG. 5 shows, for simplicity, only four source points 510, 512, 514, 516, but an actual implementation may have any desired number of source points. Examples of point sources comprise air guns, vibratory sources, etc., or combinations thereof.

The embodiments are discussed without specifying the type of seismic receiver used to record the seismic data but examples of seismic receivers comprise hydrophones, geophones, accelerometers, etc., or any combination thereof. In this sense, it is known in the art to use, for a marine seismic survey, streamers that are towed by one or more vessels and the streamers include the seismic receivers. The streamers may be horizontal or slanted or have a curved profile as illustrated in FIG. 6.

Figure 6:
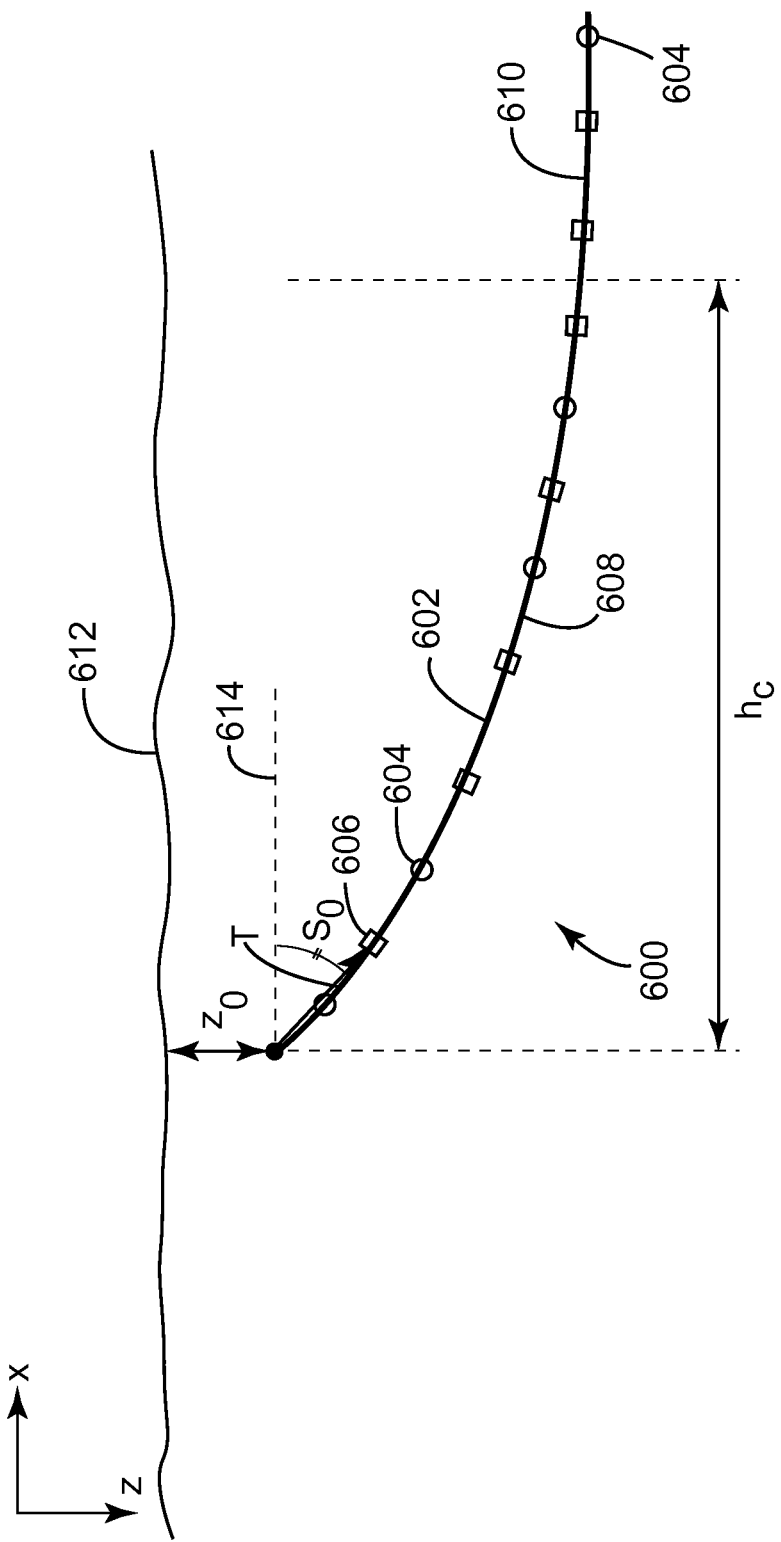
FIG. 6 depicts an exemplary variable-depth marine seismic streamer.

The curved streamer 600 of FIG. 6 includes a body 602 having a predetermined length; plural detectors 604 provided along the body; and plural birds 606 provided along the body for maintaining the selected curved profile. The streamer is configured to flow underwater when towed such that the plural detectors are distributed along the curved profile. The curved profile may be described by a parameterized curve, e.g., a curve described by (i) a depth z0 of a first detector (measured from the water surface 612), (ii) a slope s0 of a first portion T of the body with an axis 614 parallel with the water surface 612, and (iii) a predetermined horizontal distance hc between the first detector and an end of the curved profile. It is noted that not the entire streamer has to have the curved profile. In other words, the curved profile should not be construed to always apply to the entire length of the streamer. While this situation is possible, the curved profile may be applied only to a portion 608 of the streamer. In other words, the streamer may have (i) only a portion 608 having the curved profile or (ii) a portion 608 having the curved profile and a portion 610 having a flat profile, the two portions being attached to each other.

Considering seismic survey acquisition system configurations, changes to the system configuration can be made to boost the acquisition signal in the lower seismic octave, i.e., 1 Hz to 6 Hz, and to boost the recording of the signal in the lower seismic octave. This low frequency source improvement is represented as the LF Source 1402 area in FIG. 14. For both source and receiver configurations, the changes can be optimizations to existing configurations allowing the collection of low frequency seismic data in parallel with existing seismic data collection or the changes can be standalone seismic systems to collect low frequency data in areas where traditional seismic data has already been collected. In standalone seismic systems, the collected low frequency seismic data can be merged with the previously collected seismic data.

Figure 1:
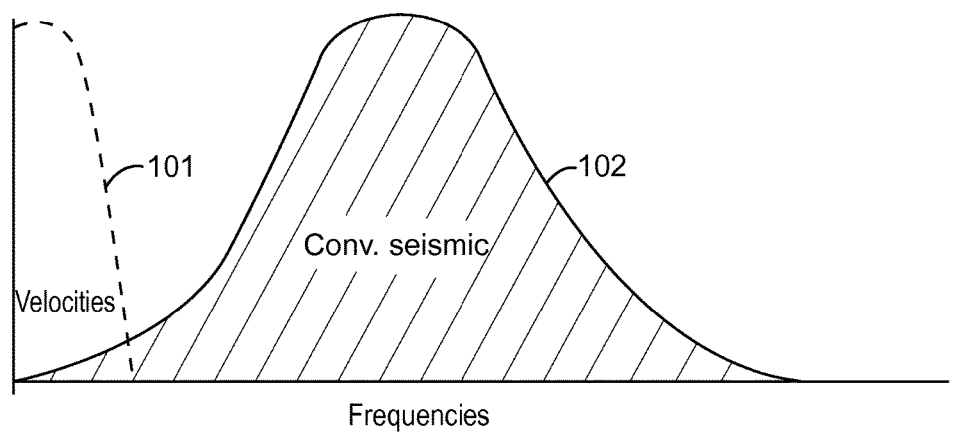
FIG. 1 depicts a graph of conventional seismic image frequency bandwidth, once the emitted source signal is bounced and filtered by the Earth and then recorded by the receivers. The velocities on the left side of the spectrum are the result of a direct measurement at the drilled well. A gap of information is noted between this measured velocities and the seismic acquired data.
Figure 2:
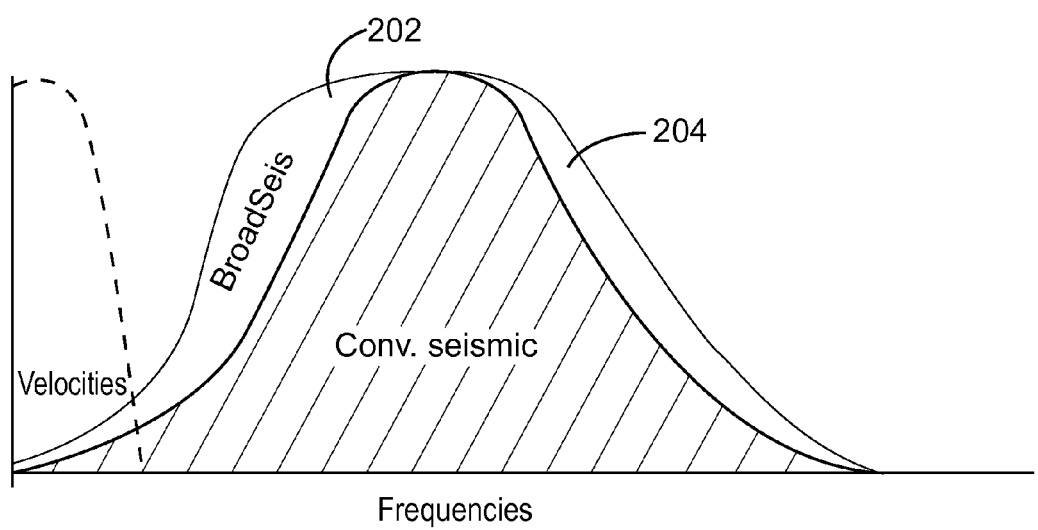
FIG. 2 depicts a graph of conventional seismic image frequency bandwidth enhanced by a BroadSeis technique.
Figure 3:
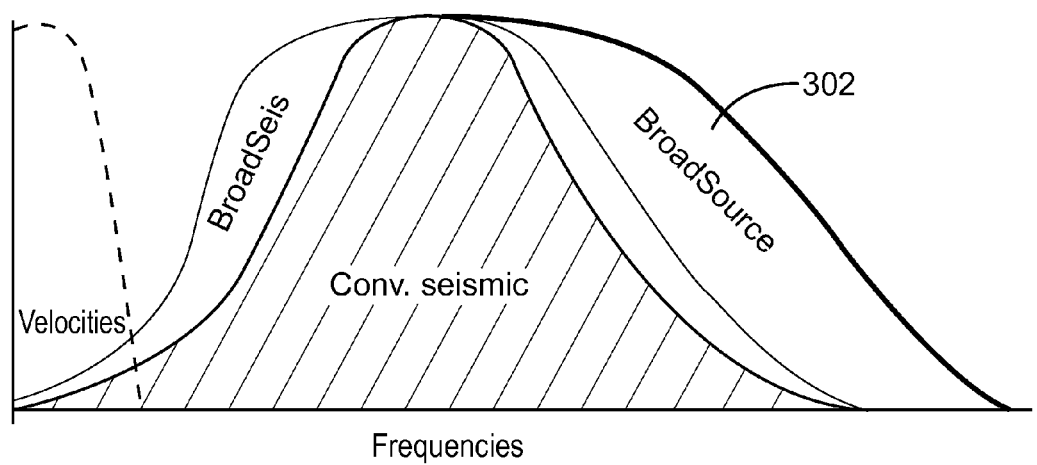
FIG. 3 depicts a graph of conventional seismic image frequency bandwidth enhanced by a BroadSeis and a BroadSource technique.
Figure 15:
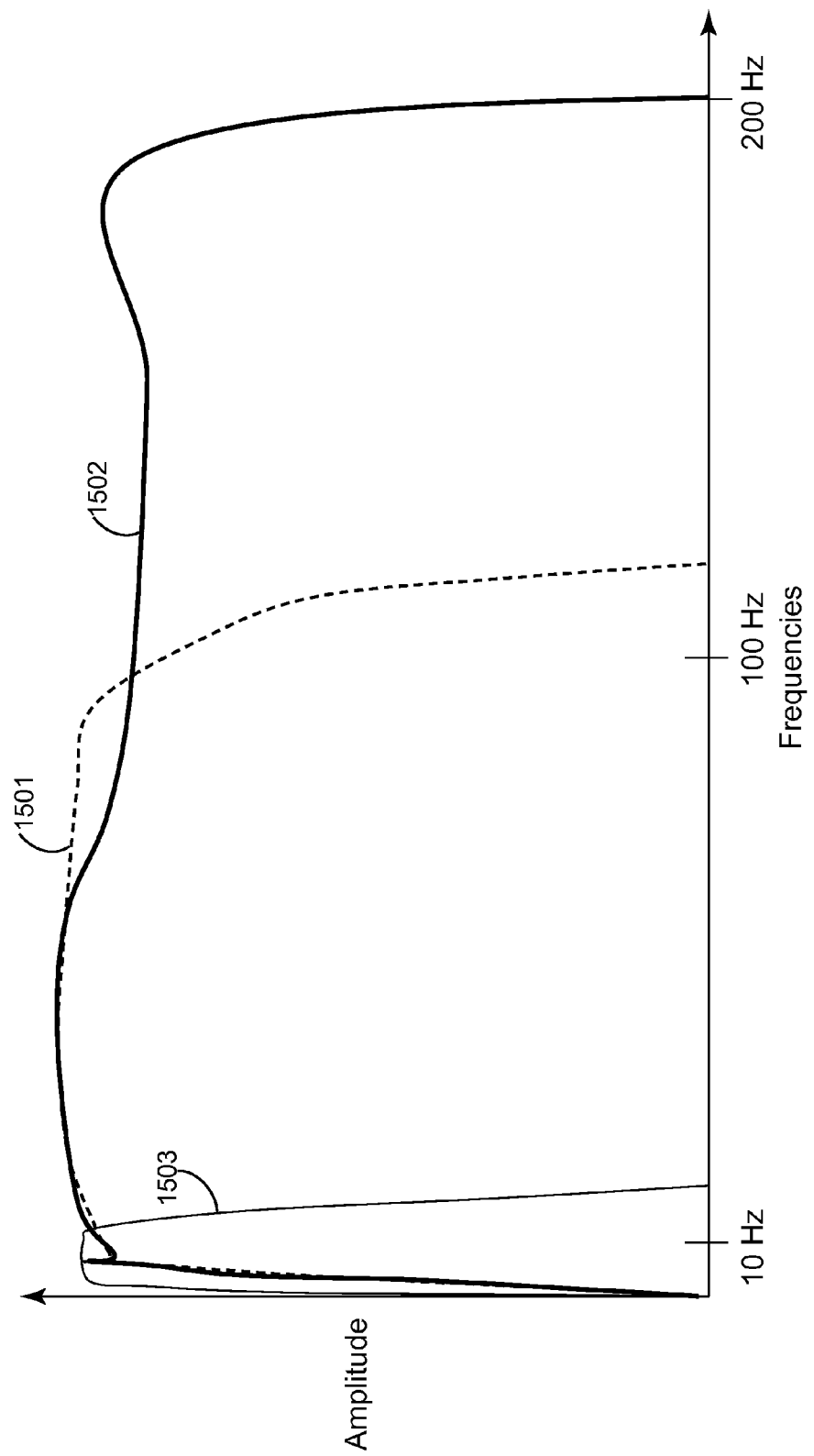
FIG. 15 depicts source amplitude spectrum comparisons for a typical conventional source amplitude spectrum (emitted signal), a typical BroadSource amplitude spectrum (emitted signal), a tuned Low-Frequency source amplitude spectrum (emitted signal).

Application of the embodiments described herein is particularly useful to Full Waveform Inversion (FWD) techniques for building high resolution velocity models for seismic imaging. The ability to record the seismic data in the 1 Hz to 6 Hz frequency bandwidth provides for seismic imaging of a much higher quality because simulated data for this bandwidth is no longer required. Although the simulated data can fill the low bandwidth gap, the simulated data cannot create the features that are presented by actual data in the 1 Hz to 6 Hz bandwidth. In one embodiment, the seismic source arrays can be modified to use additional air guns, having large volumes, e.g., a plurality of 200 cubic inch or large air guns totaling over 500 to 1000 cubic inches, in addition to the existing large air guns. Note that the traditional source arrays may use two large guns. Whereas the existing large air guns are used in combination with smaller air gun volumes to achieve a conventional seismic emission signal with a flat frequency spectrum 1501 as illustrated in FIG. 15, or with a Broadsource to achieve a flat spectrum 1502, the additional large air guns act as a low-frequency tuned energy source for boosting the low-frequency emission of the traditional seismic source array between 1 and 6 Hz as illustrated by curve 1503. The additional air guns may be organized on one level, or several levels to remove the source ghost notch. It should be noted in the embodiment that the additional large volume air guns generate more low frequencies than the existing large air guns. It should further be noted in the embodiment that smaller volume air guns can be included for tuning if necessary. It should further be noted in the embodiment that one or more of these types of assemblies can be employed on one or more sub-arrays in a standalone configuration or in conjunction with the conventional seismic source sub-arrays. In this way, the traditional source array is modified to include the low-frequency tuned energy source to extend the conventional seismic image bandwidth to a larger bandwidth, closer to a range between 1 Hz and 200 Hz. Further, the additional large air guns are configured to generate low-frequencies, as illustrated by curve1503, necessary for full-waveform inversion processing, allowing to bridge between the velocities measured at the drilled well 101 and the conventional seismic bandwidth 102 in FIG. 1.

In another optimization associated with the embodiment seismic sources for the lower octaves, the shot point interval can be less frequent than a shot point interval for a conventional seismic acquisition. For example, the lower octave embodiment sources can be fired anywhere from every other to every four or more shots compared to a conventional shot point interval. It should be noted in the embodiment that a conventional shot point interval is approximately 12.5 meters. Considering another optimization associated with the embodiment lower octave sources, the air guns can be charged with a higher pressure compressed air. For example, the embodiment lower octave sources can be charged with 3000 psi compressed air compared to the 2000 psi compressed air to tune the main frequency resonance of the air gun to the desired lower end of the spectrum. Further, one air supply at the higher pressure can be used with regulators to match the required air pressure with each source.

Considering embodiment optimizations to the receivers associated with recording the lower seismic octave, i.e., 1 Hz to 6 Hz, the one or more streamers are configured with a greater separation, e.g., approximately 300 meters as a typical example, and positioning the one or more streamers at a greater depth, e.g., between 50 meters and 150 meters or between 50 meters and 100 meters, between 40 meters and 150 meters or between 40 meters and 100 meters typically. It should be noted in the embodiment that the streamer hydrophone and steering equipment will be tuned to minimize hydrostatic noise at the lower depth associated with the lower seismic octave recording. It should further be noted in the embodiment that the streamer can take a variable depth shape, for low frequency notch diversity, at 50 meters to one 150 meters (as one of the typical set-up) and can be a conventional flat deep tow or a slanted deep tow.

Figure 7:
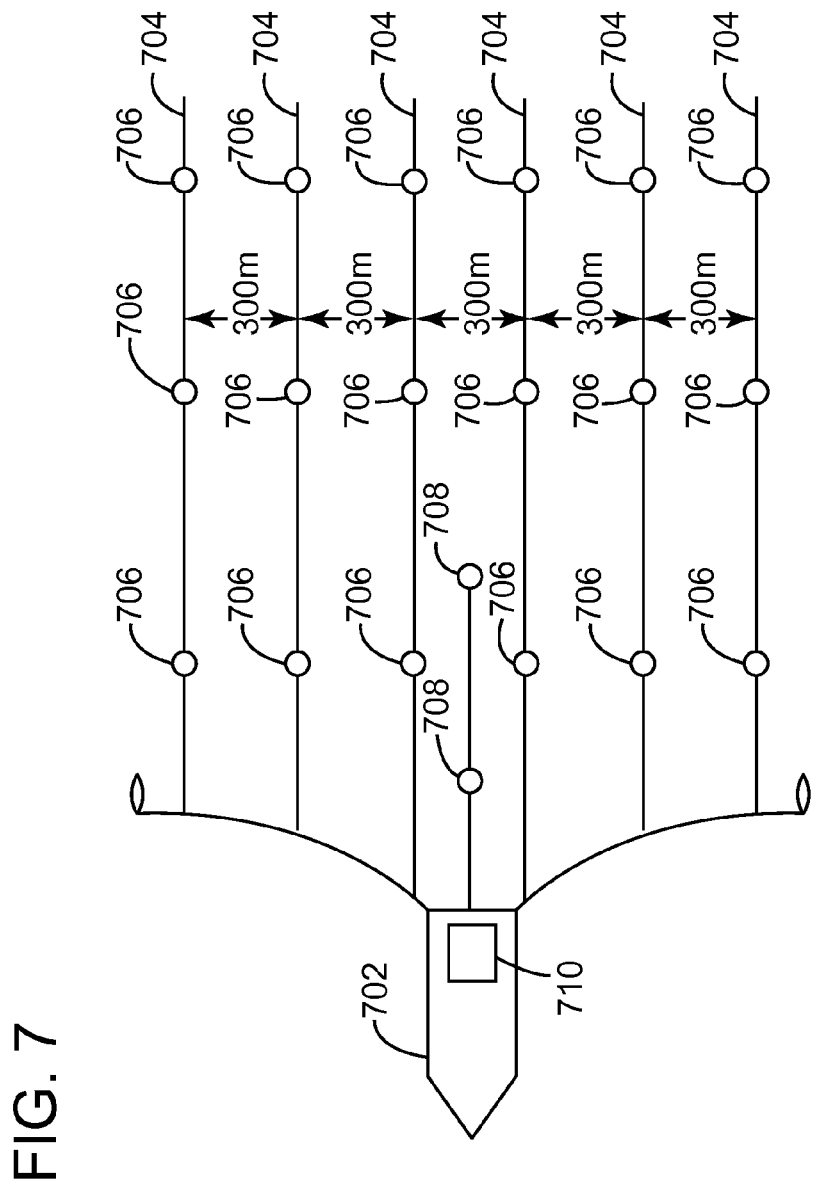
FIG. 7 depicts a cross-line view of a full seismic bandwidth configuration associated with the embodiments.
Figure 8:
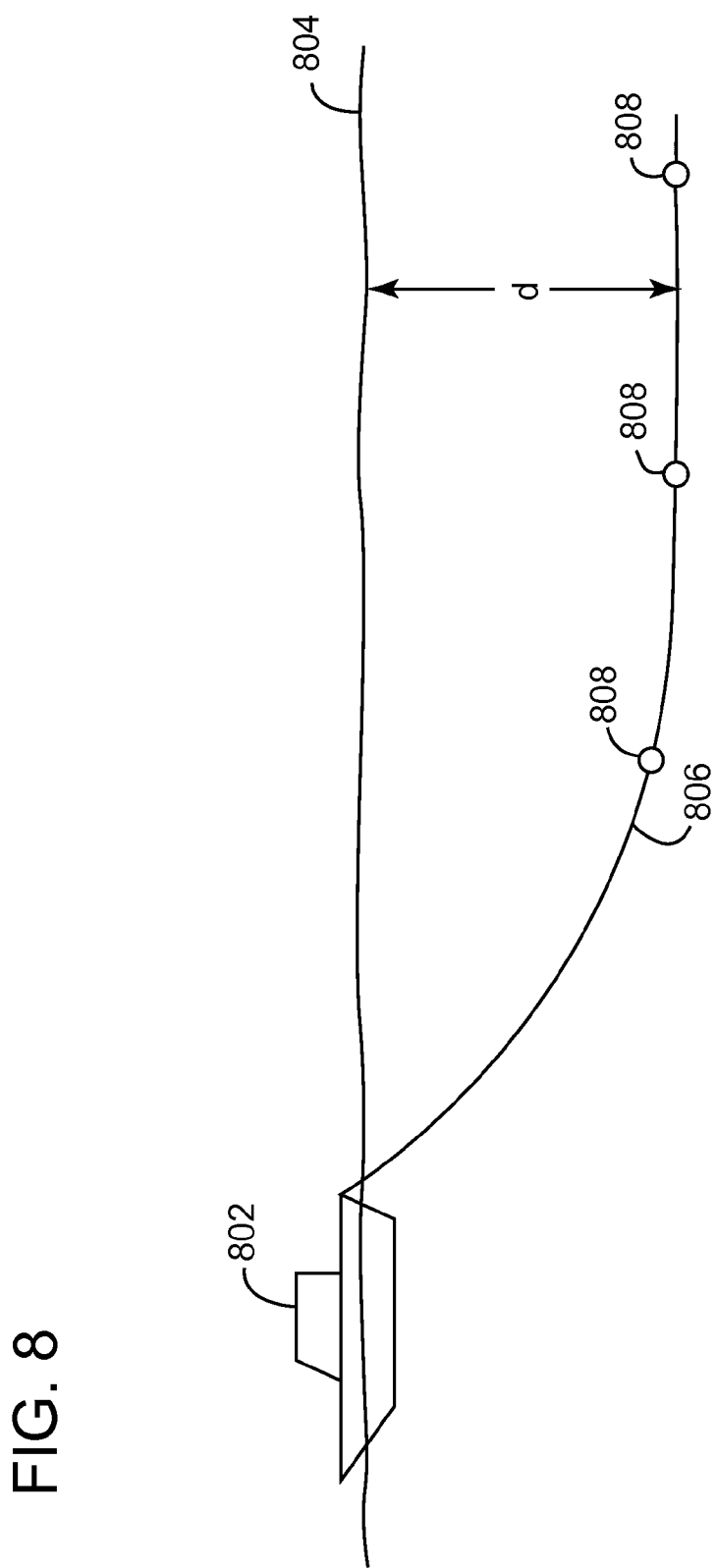
FIG. 8 depicts a tow-depth view of a full seismic bandwidth configuration associated with the embodiments.

Looking now to FIG. 7 and a standalone low octave configuration, a tow vessel 702 is towing a streamer array of low octave streamers 704 with a 300 meter cross-line separation as a typical example. It should be noted in the embodiment that other cross-line separations are acceptable but in general the cross-line separation can be greater than that of a convention bandwidth configuration, e.g., 50 to 100 m cross-line separation. Each streamer in the embodiment contains a plurality of receivers 706 that are tuned for the low octave frequency. A low octave source 708 is towed to provide seismic waves in the low octave bandwidth, e.g., 1 Hz to 6 Hz and a recording device 710 for archiving the low octave seismic data. Looking to FIG. 8 and another standalone embodiment depiction, the tow vessel 802 is towing one or more streamers 806 configured with one or more receivers 808. The receivers are tuned for the low octave frequency and are towed at a preconfigured depth d of between 50 meters and 150 meters or between 50 meters and 100 meters, between 40 meters and 150 meters or between 40 meters and 100 meters typically, below the water surface 804.

Continuing with embodiment optimizations, the vessel towing speed can be reduced to minimize the noise level during acquisition. For example, an acquisition speed of approximately one knot for a standalone acquisition, compared to an acquisition speed of four knots to six knots for a conventional tow system. It should be noted in the embodiment that an even lower tow speed is possible using only one streamer and no diverters. It should further be noted in the embodiment that the vessel containing the recording equipment can also contain the tuned seismic source array for emitting the lower seismic octave or the source array can be on the recording vessel and one or more other source vessels wherein the source vessels are shooting either simultaneously or alternatively.

In another aspect associated with the recording vessel and the one or more other source vessels, the speed of the recording vessel can be different than the speed of the one or more source vessels. For example, the recording vessel can travel at one knot to minimize noise during recording while the one or more source vessels can travel at six knots or greater to minimize acquisition time and offset length. It should be noted in the embodiment that a standalone lower seismic octave acquisition, as described above, can be merged with previously acquired conventional acquisition to generate a full bandwidth seismic dataset.

Continuing with the embodiments, the low frequency tuned seismic configuration can be combined with a conventional seismic acquisition system. In this embodiment the full bandwidth, i.e., the lower octave in combination with the previously described conventional seismic bandwidth, can be obtained with a configuration comprising one or more deep towed streamers tuned for the lower seismic octave and a conventional streamer pattern towed flat, slanted or in a variable depth arrangement to optimize the receiver recording. It should be noted in the embodiment that the deep towed streamers are at a depth of approximately between 50 meters and 150 meters or between 50 meters and 100 meters, between 40 meters and 150 meters or between 40 meters and 100 meters typically, and the conventional streamer pattern is towed from 4 meters to 50 meters based on the selected streamer arrangement.

Figure 9:
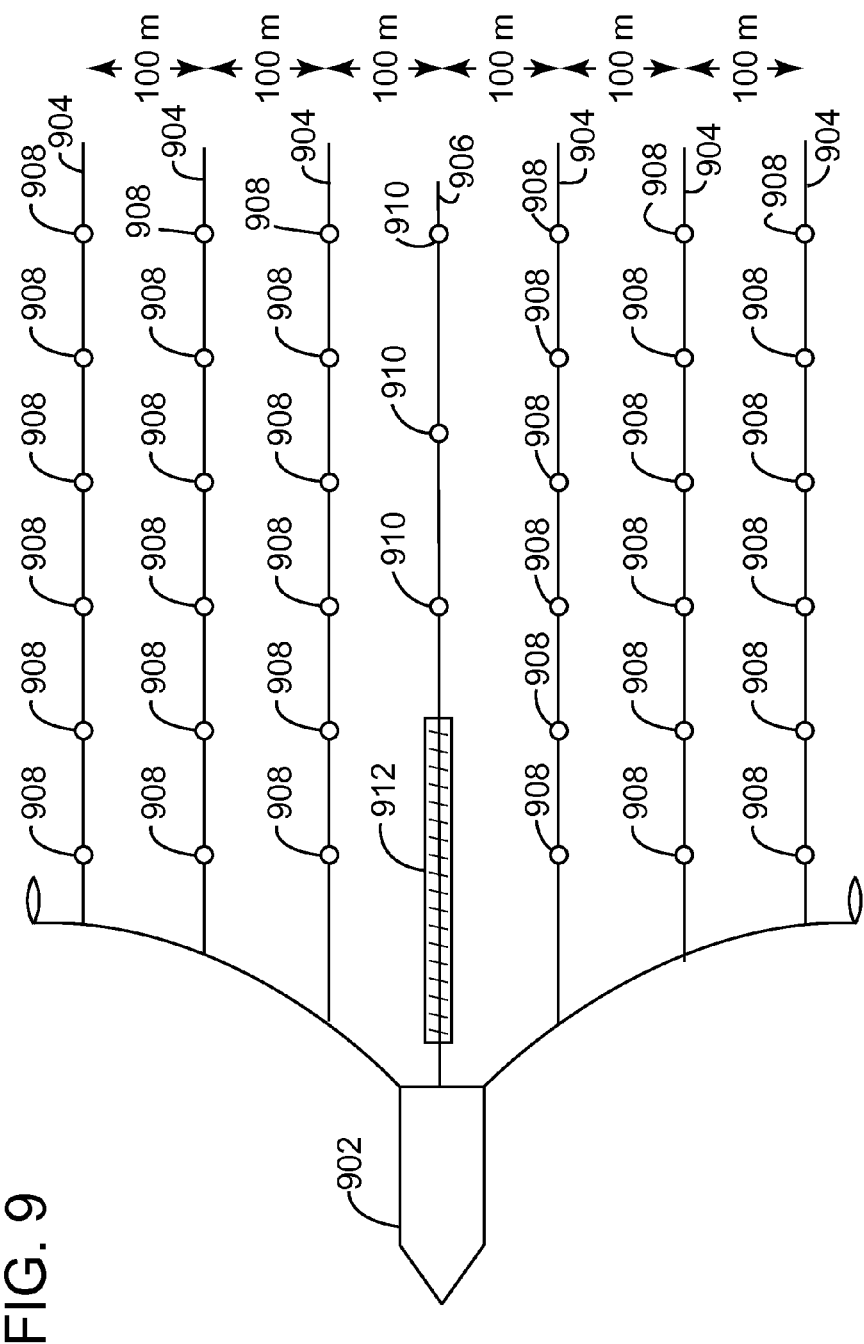
FIG. 9 depicts an autonomous source view of a full seismic bandwidth configuration associated with the embodiments.

Looking to FIG. 9 and an embodiment of a combined low octave and conventional seismic acquisition system, a tow vessel 902 tows a plurality of conventional streamers 904 and a low-octave streamer 906. The conventional streamers are approximately 100 meters apart and have conventional receivers 908 attached. The low octave streamer 906 has receivers 910, tuned for the low-octave frequency, attached and can have an active or a passive streamer head section or a lead-in, e.g., fiber-optic cable with resistant stress members, section 912 to allow for the lower tow depth of the low frequency streamer. It should be noted in the embodiment that the active or passive streamer head section or a lead-in section 912 can be from 150 meters to 300 meters in length and is the section adjacent to the tow vessel 902.

Figure 10:
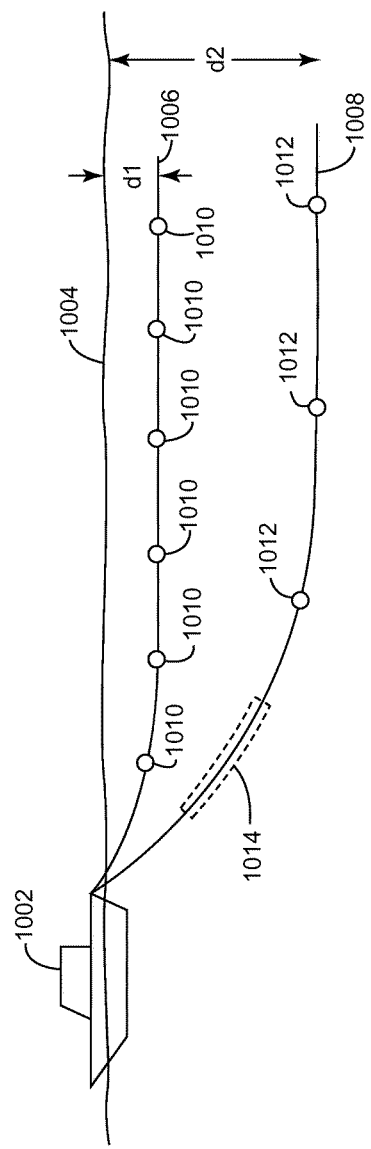
FIG. 10 depicts an autonomous tow-depth view of a full seismic bandwidth configuration associated with the embodiments.

Looking to FIG. 10, and another embodiment of a combined system, a tow vessel 1002 tows conventional streamers 1006 and a low octave streamer 1008. In one embodiment, conventional streamer 1006 is flat while the low octave streamer 1008 has a curved profile. Conventional receivers 1010 are attached to the conventional streamers 1006 and receivers tuned for the low octave frequency 1012 are attached to the low-octave streamer 1008. The conventional streamers 1006 are towed at a depth d1 of 4 meters to 50 meters below the water surface 1004 and the low-octave streamer is towed at a depth d2 of from between 50 meters and 150 meters or between 50 meters and 100 meters, between 40 meters and 150 meters or between 40 meters and 100 meters typically, below the water surface 1004.

Continuing with the embodiment, the tow speed can be optimized for either reducing noise with a lower speed or decreasing collection time with a higher speed and removing the low frequency noise during seismic data processing. It should further be noted that the low octave streamer can be towed flat at a depth below 60 meters, slanted between a depth of approximately 40 meters and 150 meters and variable depth between approximately 50 meters and 100 meters or more and can have an active or a passive section, or a lead-in section 1014 adjacent to the tow vessel 1002. In one aspect of the embodiment, the conventional streamers 1006 are towed in a flat configuration, at an appropriate depth, and the one or more low-octave streamers 1008 are towed in a curved configuration, at an appropriate depth greater than the depth of the conventional streamers.

Next in the embodiment, the low octave receivers can be autonomous devices that are self-contained in terms of power supply and recording capability, e.g., nodes that can be connected in a chain and towed linearly. It should be noted in the embodiment that these autonomous devices can be designed with a hydrodynamic shape to minimize vibration and motion induced noise. It should further be noted in the embodiment that the connection for towing the autonomous devices can be completely mechanical and not require any power or communication lines. An embodiment mechanical towing line can also be equipped with fairings to avoid strumming noise while towing.

Figure 11:
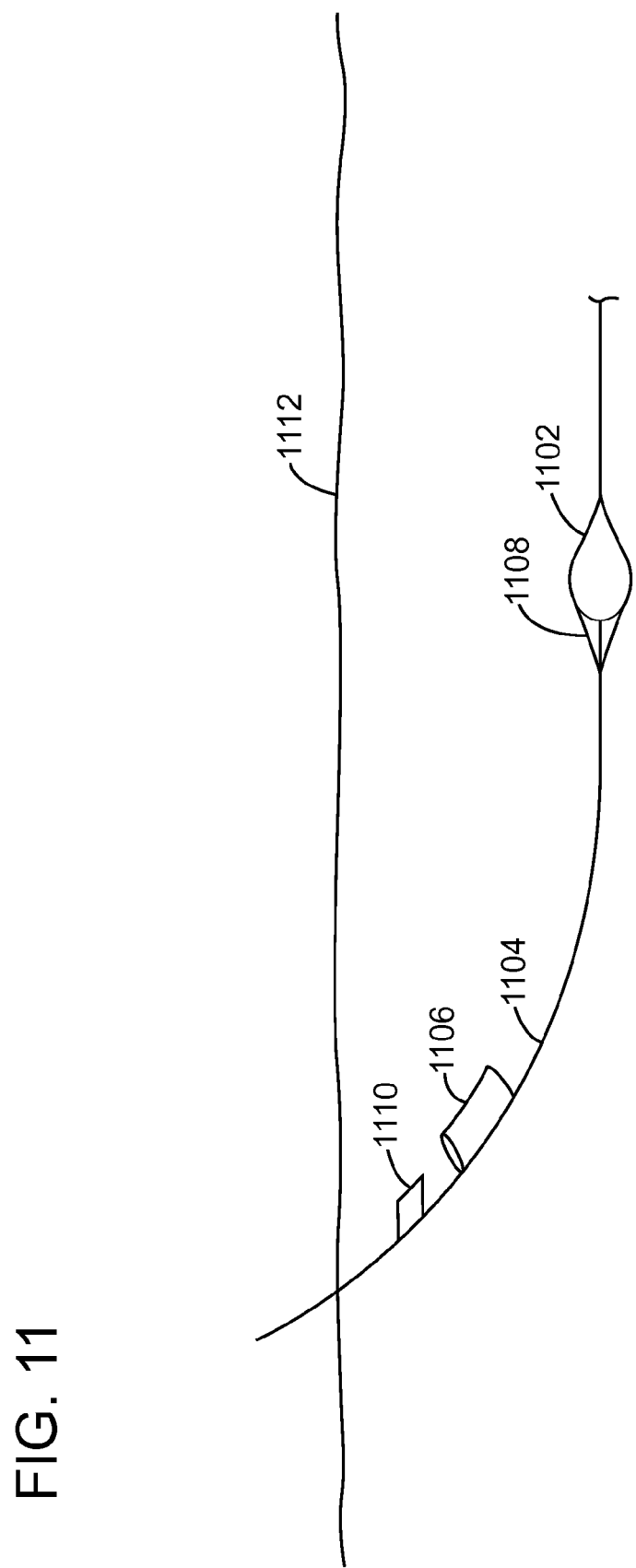
FIG. 11 depicts a tow-depth view of an alternative configuration associated with the embodiments.

FIG. 11 depicts representative autonomous devices 1102, 1106 connected to a mechanical cable 1104 and towed below the water surface 1112. It should be noted in the embodiment that the autonomous device 1102 is a low frequency recorder designed for inline tow and autonomous device 1106 is a low frequency recorder designed for a sloped tow. The embodiment further comprises an anti-vibration and hydrodynamic profiler 1108 adjacent to the inline tow autonomous device 1102 and a fairing 1110 adjacent to the sloped tow autonomous device 1106 for avoiding/reducing strumming noise. It should be noted in the embodiment that the autonomous device 1102, 1106 can also be the same device but they can be covered with a container, e.g., a silicone body or envelope, for creating a hydrodynamic shape.

Figure 12:
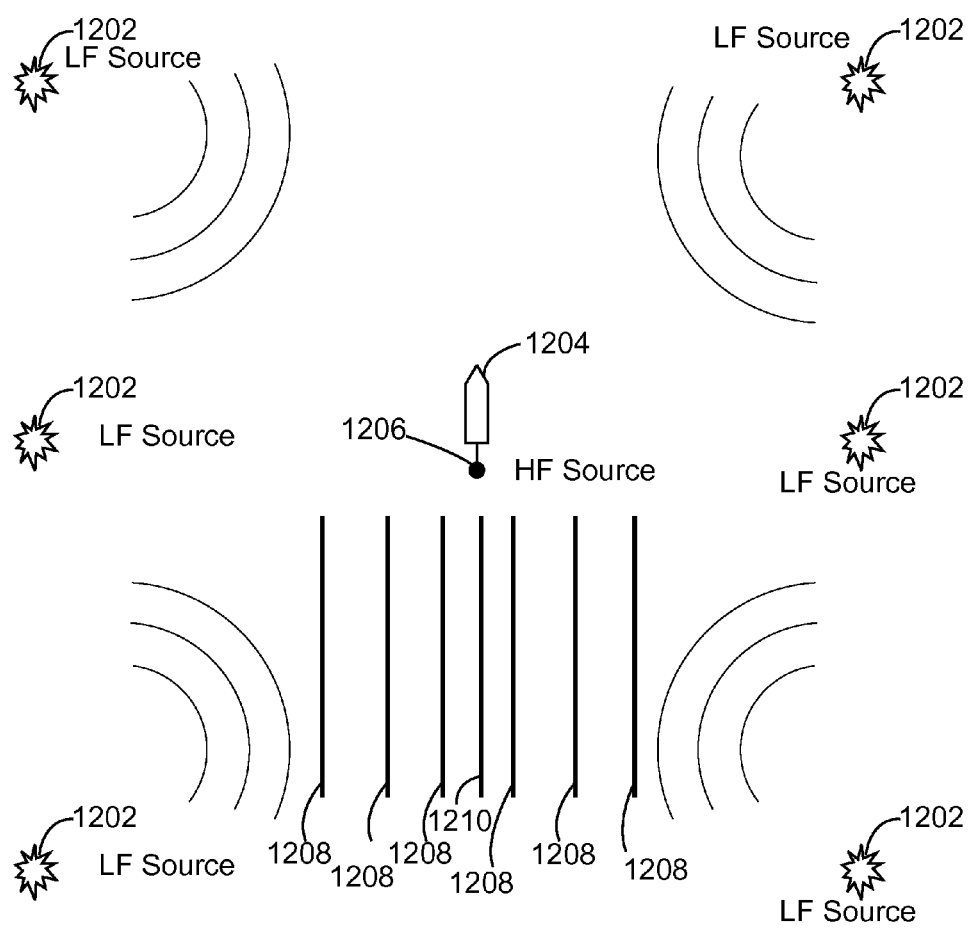
FIG. 12 depicts a configuration of stationary low-frequency sources associated with the embodiments.

Looking to FIG. 12 and another embodiment, a plurality of low frequency sources 1202 can be positioned, in a stationary arrangement around the seismic sample area. It should be noted in the embodiment that low frequency sources can be larger than conventional sources and accordingly, can be very heavy and difficult to tow. Examples of a stationary arrangement can be buoys that are tethered to the sea bottom if the depth is not too great for tethering, free floating in the water at a preconfigured depth, with the associated repositioning after drift, suspended from a barge allowing the barge to perform the positioning and self-positioning with a propulsion system to counter any drift. The tow vessel 1204 can then tow a conventional high frequency source 1206 and streamers 1208 for conventional frequency acquisition and one or more low octave streamers 1210 with low octave tuned receivers for the low octave recording. It should be noted in the embodiment that as previously described the tow vessel can operate as a standalone low octave seismic data collector and only tow one or more low octave streamers with low octave tuned receivers. In one embodiment, a distance range between two adjacent low frequency sources 1202 may be about tens if not hundreds of kilometers.

Figure 13:
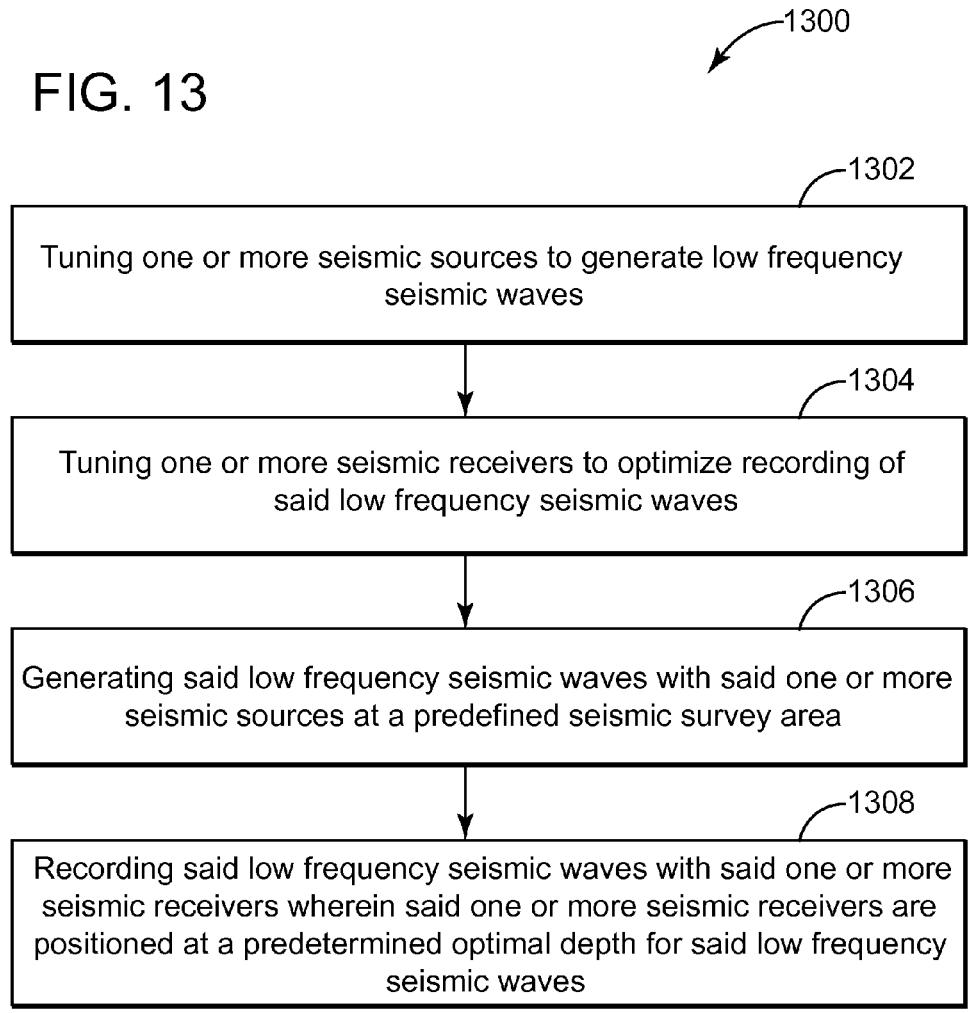
FIG. 13 depicts a flowchart of a method embodiment.

Looking now to FIG. 13, a method embodiment 1300 for acquiring seismic data is depicted. Starting at step 1302, the method embodiment 1300 tunes one or more seismic sources to generate low frequency seismic waves. It should be noted in the method embodiment 1300 that examples of a tuned source can be an air gun with a greater volume than a conventional air gun, e.g., a plurality of 200 or larger cubic inch air guns totaling over 500 to 1000 cubic inches that are added in addition to already existing large gun in a traditional seismic source array. It should be noted in the embodiment that the additional large volume air guns generate more low frequencies than the existing larger volume air guns. In another aspect of the method embodiment 1300, a tuned source air gun can comprise a greater air pressure, e.g., 3000 psi. Next at step 1304, the method embodiment 1300 tunes one or more seismic receivers to optimize recording of the low frequency seismic waves. It should be noted in the method embodiment 1300 that the tuned seismic receivers will be deployed at a depth of between 50 meters and 150 meters or between 50 meters and 100 meters, between 40 meters and 150 meters or between 40 meters and 100 meters typically.

Next at step 1306, the method embodiment 1300 generates the low frequency seismic waves with the one or more seismic sources at a predefined seismic survey area. It should be noted in the method embodiment that the seismic sources can be used in a standalone low frequency seismic data acquisition or they can be combined with conventional seismic sources for a full seismic bandwidth data acquisition. Continuing at step 1308, the method embodiment 1300 records the low frequency seismic waves with the one or more seismic receivers wherein the one or more seismic receivers are positioned at a predetermined optimal depth for the low frequency seismic waves. It should be noted that the predetermined optimal depth is between 50 meters and 150 meters or between 50 meters and 100 meters, between 40 meters and 150 meters or between 40 meters and 100 meters typically.

Figure 14:
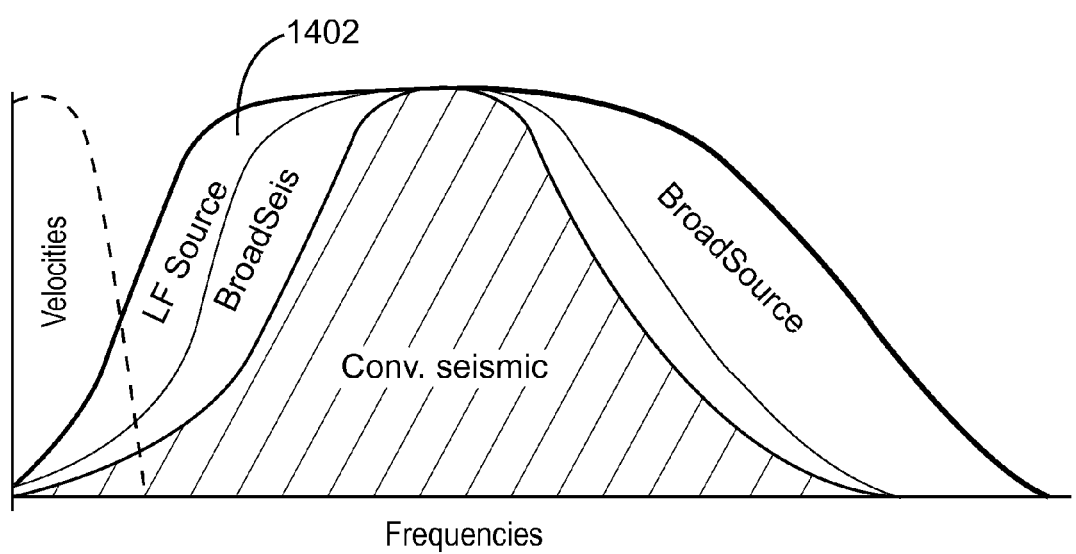
FIG. 14 depicts a graph of conventional seismic image frequency bandwidth enhanced by a BroadSeis and a BroadSource technique and further enhanced by low frequency sources associated with the embodiments.

FIG. 14 illustrates an improvement produced by the low frequency source and the low frequency streamers of the embodiments discussed above, i.e., the reduction of a gap in the one to six Hz as illustrated by curve 1402.

The disclosed exemplary embodiments provide a seismic data acquisition system, and a method for acquiring low frequency seismic data. It should be understood that this description is not intended to limit the invention. On the contrary, the exemplary embodiments are intended to cover alternatives, modifications and equivalents, which are included in the spirit and scope of the invention. For example, the sources used in the embodiments may be impulsive and/or vibratory. The sources may be operated simultaneously, in a flip-flop manner or according to any known scheme. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for acquiring seismic data over a water-covered survey area, said method comprising:
    towing a seismic source emitting seismic waves with higher amplitude at frequencies above 10 Hz than at frequencies below 10 Hz, and seismic receivers configured to detect the seismic waves;
    tuning one or more additional seismic sources to emit low frequency seismic waves at frequencies less than 10 Hz so that a frequency spectra for both said seismic source and said additional one or more seismic sources becomes flat in a range of frequencies from 1 Hz to over 50 Hz;
    tuning one or more among said seismic receivers and steering equipment to optimize recording said low frequency seismic waves by towing said one or more among said receivers at depths larger than 30 m under water surface;
    generating said low frequency seismic waves with said additional one or more seismic sources deployed over said water-covered survey area; and
    recording said low frequency seismic waves with said one or more among said seismic receivers.

2. The method of claim 1, wherein said low frequency seismic waves are waves in a frequency bandwidth of about 1 to 6 Hz.

3. The method of claim 1, wherein said predetermined depth is between approximately 50 meters and 150 meters, or between 50 meters and 100 meters, or between 40 meters and 150 meters, or between 40 meters and 100 meters.

4. The method of claim 1, wherein said additional one or more seismic sources include air guns with volumes of at least 200 cubic inches each.

5. The method of claim 4, wherein said air guns are charged with air at a pressure of approximately 3000 pounds per square inch (psi).

6. The method of claim 1, wherein a vessel tows said additional one or more seismic sources and said one or more among said seismic receivers over the water-covered survey area.

7. The method of claim 6, wherein said vessel tows said seismic receivers other than said one or more among said seismic receivers using first streamers at a first cross-line distance there-between, and said one or more among said seismic receivers using second streamers at a second cross-line distance there-between, the second distance being larger than the first distance.

8. The method of claim 1, wherein a first vessel tows said additional one or more seismic sources, and a second vessel tows said one or more among said seismic receivers.

9. The method of claim 8, wherein said first tow vessel and said second tow vessel travel at different speeds.

10. The method of claim 1, wherein said additional one or more seismic sources are autonomous and tethered to said water-covered survey area.

11. The method of claim 1, wherein said additional one or more seismic sources are one of autonomous and deployed at a position associated with said water-covered survey area, or autonomous and self-propelled for maintaining said predefined position.

12. The method of claim 1, further comprising:
generating said seismic waves by said seismic source; and
recording said seismic waves by said seismic receivers other than said one or more among said seismic receivers, positioned at a predetermined optimal depth different than said predetermined depth.

13. The method of claim 1, wherein said additional one or more seismic sources include air guns having a total volume over 500 cubic inches.

14. A system for collecting seismic data over a water-covered survey area, said system comprising:
a seismic source emitting seismic waves with higher amplitude at frequencies above 10 Hz than at frequencies below 10 Hz;
a plurality of additional low frequency tuned seismic sources for generating low frequency seismic waves at frequencies less than 10 Hz so that a frequency spectra for both said seismic source and said plurality of additional low frequency tuned seismic sources becomes flat in a range of frequencies from 1 Hz to over 50 Hz;
seismic receivers including low frequency tuned seismic receivers, attached to a first plurality of streamers, for recording said low frequency seismic waves;
one or more tow vessels for towing said first plurality of streamers across said water-covered survey area; and
a recording device for archiving recorded seismic data generated by said seismic receivers.

15. The system of claim 14, wherein
said seismic receivers other than said low frequency tuned seismic receivers are attached to a second plurality of streamers towed by said one or more tow vessels.

16. The system of claim 15, wherein said first plurality of streamers are configured to tow at a depth between approximately 4 and 50 meters and said second plurality of streamers are configured to tow at a depth between 50 meters and 150 meters or between 50 meters and 100 meters or between 40 meters and 150 meters or between 40 meters and 100 meters typically.

17. The system of claim 14, wherein said plurality of additional low frequency tuned seismic sources are autonomous seismic sources in said predefined seismic acquisition area and not towed by said tow vessels.

18. The system of claim 17, wherein said plurality of additional low frequency tuned seismic sources are autonomous seismic sources tethered at predefined locations of said water-covered survey area.

19. The system of claim 17, wherein said plurality of additional low frequency tuned seismic sources are autonomous seismic sources installed on vessels or barges other than said one or more tow vessels.

20. The system of claim 17, wherein said autonomous seismic sources are deployed at a predefined deployment location associated with said water-covered survey area.

* * * * *